United States Patent [19]
McConnell

[11] 3,986,318
[45] Oct. 19, 1976

[54] STRUCTURAL MEMBER AND ASSEMBLY THEREOF

[75] Inventor: Kennedy McConnell, Riverdale, Ill.

[73] Assignee: Interlake, Inc., Chicago, Ill.

[22] Filed: Sept. 30, 1974

[21] Appl. No.: 510,413

[52] U.S. Cl. .............................. 52/758 R; 403/353; 211/192; 248/223
[51] Int. Cl.² ........................................ F16B 7/00
[58] Field of Search........... 52/758 R; 211/148, 175, 211/176, 177, 182, 183; 248/223, 224, 225, 243; 108/107, 156; 312/257 SK; 403/353, 231

[56] References Cited
UNITED STATES PATENTS

| | | | |
|---|---|---|---|
| 3,273,720 | 9/1966 | Seiz.................................. | 211/177 X |
| 3,303,937 | 2/1967 | McConnell ...................... | 211/176 X |
| 3,612,290 | 10/1971 | Evans.............................. | 211/148 X |
| 3,846,944 | 11/1974 | Lambert ......................... | 248/243 X |

Primary Examiner—Wayne L. Shedd
Attorney, Agent, or Firm—Prangley, Dithmar, Vogel, Sandler & Stotland

[57] ABSTRACT

A structural member for use in forming frames by having connected thereto an associated member carrying a mounting stud having a shank with an enlarged head thereon, the structural member including a plurality of clover-leaf shaped holes in alignment therealong for receiving the mounting stud, each of the holes including four cusps arranged therearound with the edges of adjacent cusps joined by concave surfaces, at least one of the concave surfaces extending downwardly with the associated cusps disposed generally horizontally when the structural member is in its operative position, the cusps each having a generally vertically oriented straight side with opposed ones of said straight sides being joined by one of the concave surfaces at the bottom ends thereof, the straight sides converging toward the associated concave surface and being spaced apart at the points of the cusps a first distance slightly less than the diameter of the shank of the associated stud with the points of the cusps being spaced from the farthest point on the associated concave surface a second distance greater that the radius of the shank of the associated stud; there also is provided an assembly including first and second structural members and a snap lock to hold the mounting stud in the associated clover-leaf shaped hole, and to make sure the associated stud is properly seated in the clover-leaf shaped hole.

9 Claims, 7 Drawing Figures

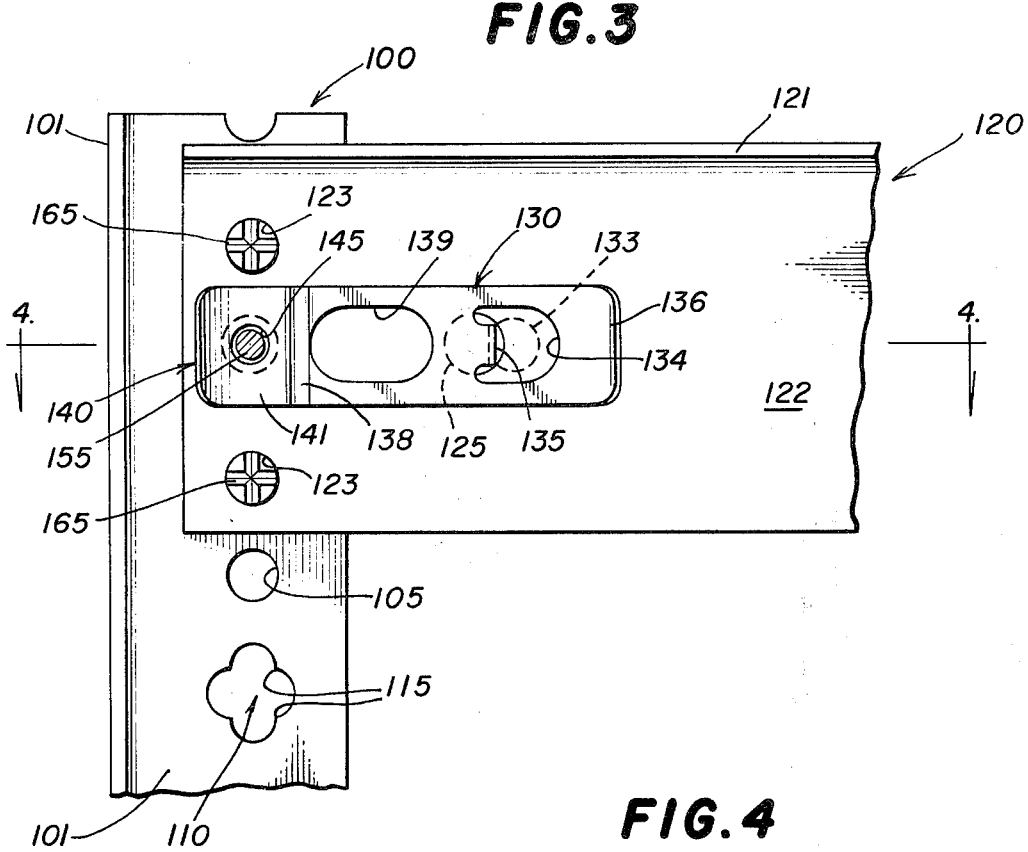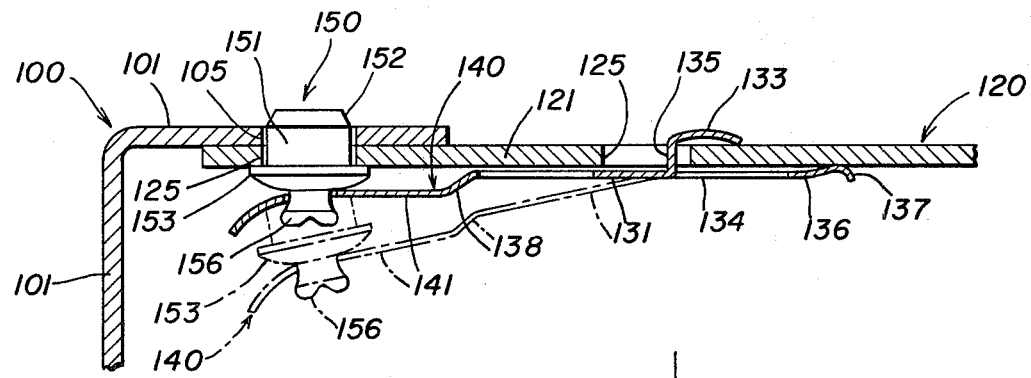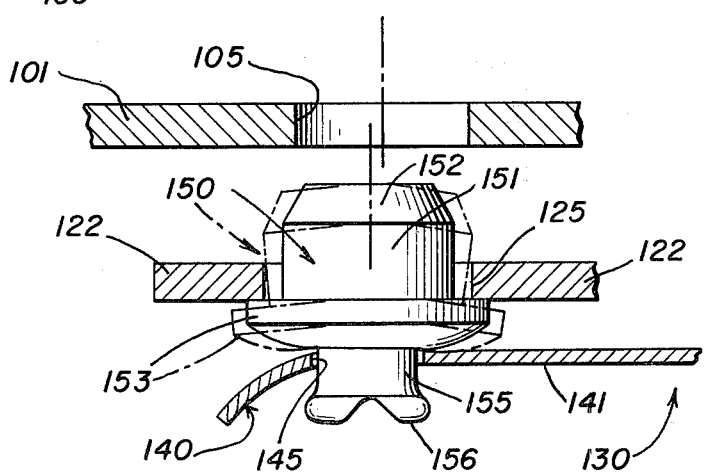

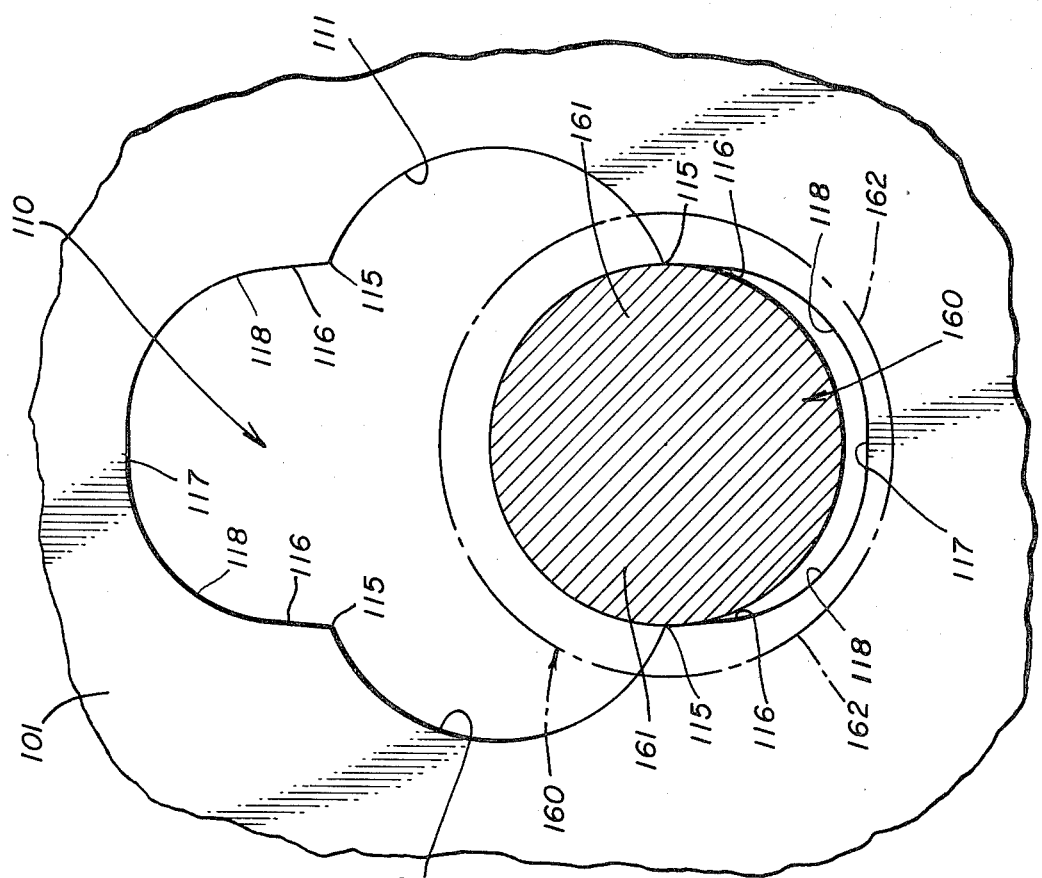

STRUCTURAL MEMBER AND ASSEMBLY THEREOF

BACKGROUND OF THE INVENTION

The present invention relates generally to structural members of the slotted angle type, and specifically to the provision of such a structural member having holes therein of an improved shape better to receive and hold an associated mounting stud therein.

Structural members have been provided heretofore with clover-leaf shaped holes wherein four identical cusps were arranged equiangularly therearound with concave surfaces joining adjacent cusps. In order to provide a tight joint when a headed stud was engaged in one of the clover-leaf holes, the shank of the stud was designed to rest upon the bottom radius of one of the concave surfaces, and in order to provide as tight a joint as possible, a snap lock was provided engaging in aligned apertures in the structural members being joined to hold the shank of the stud on the associated concave surface. Even when the resultant joint appeared to be tight, it was not tight enough to prevent racking between the upright and horizontal structural members. This racking resulted from the fact that the shank of the mounting stud had a slightly smaller radius than the radius of the bottom of the engaged concave surface and would slightly roll along the bottom radius of the engaged concave surface.

In yet other slotted angle designs for structural members, nuts and bolts were used to join the vertical and horizontal members in an effort to provide a tight joint therebetween. Racking still occurred because of the necessity to provide manufacturing tolerances, and the necessary rigidity was imparted to the resultant structure only by adding braces or other connections thereto.

Examplars of prior art structure of this general type are disclosed in U.S. Pat. No. 3,028,937 granted Apr. 10, 1962 to Edward W. Grabowski and Charles R. Johnson, U.S. Pat. No. 3,303,937 granted Feb. 14, 1967 to Kennedy McConnell, and U.S. Pat. No. 3,392,848 granted July 16, 1968 to Kennedy McConnell et al. The snap lock of the present application is disclosed in applicant's copending application for U.S. Pat. application Ser. No. 401,189 filed Sept. 27, 1973 now U.S. Pat. No. 3,905,712, issued Sept. 16, 1975, and the disclosure thereof is incorporated herein by reference.

SUMMARY OF THE INVENTION

The present invention provides a structural member with an improved clover-leaf shaped hole therein that receives the shank of a headed mounting stud therein to form therewith a more tight connection that prevents racking between the joined members. A snap lock is utilized to insure that the stud is firmly seated in the hole and to prevent removal of the stud from this firmly seated position. The rigidity provided by the improved structural member of the present invention makes it practical to produce structural assemblies, such as bulk storage racks and the like, that require no bracing or other connections in addition to the clover-leaf hole and headed stud connection of the present invention.

This is accomplished in the present invention, and it is an object of the present invention to accomplish these desired results, by providing a structural assembly comprising a first structural member and a second structural member and a snap lock, the first structural member having a plurality of clover-leaf shaped holes therein in longitudinal alignment therealong and a first aperture between the holes, each of the holes including four cusps arranged therearound, at least two adjacent ones of the cusps each having a generally longitudinally oriented straight side with opposed ones of the straight sides being joined by a concave surface at the other ends thereof, the second structural member having thereon at least one mounting stud having a shank and an enlarged head, a second aperture adjacent to the mounting stud and shaped essentially identical to the first aperture, the snap lock including a resilient body mounted on the second structural member and having a lock pin extending outwardly therefrom and loosely fitting and trapped thereon, the lock pin being constructed and arranged snugly to fit in the first and second apertures, the structural members being arranged with the mounting stud extending through one of the holes and with the first and second apertures in misalignment with each other and with the first aperture in misalignment with the lock pin, the shank being driven past the points of the cusps and being wedged and firmly seated between the straight sides with all portions of the shanks spaced from the associated concave surfaces and with the first and second apertures in alignment with the lock pin snugly fitting therethrough, whereby the shank and the straight sides and the lock pin and the first aperture cooperate so that the lock pin fits through the first aperture only when the shank is in the firmly seated position, the lock pin retaining the shank along the straight sides in the firmly seated position, thus providing a tight joint between the first and second structural members and eliminating racking therebetween.

In connection with the foregoing object, it is another object of the invention to provide a structural assembly of the type set forth, wherein the second structural member includes two mounting studs adapted to be respectively received in two of the holes in the first structural member.

A further object of this invention is to provide a structural assembly of the type set forth, wherein the resilient body of the snap lock is deformable to permit the lock pin to be withdrawn from the aligned apertures in the structural members, the resiliency of the body urging the lock pin into the aligned apertures in the structural members in maintaining the lock pin therein, the loose fit between the lock pin and the body providing tilting movement of the lock pin into the aligned apertures of the structural members.

Further features of the invention pertain to the particular arrangement of the parts of the structural member and the structural assembly, whereby the above outlined and additional operating features thereof are attained.

The invention, both as to its organization and method of operation, together with further features and advantages thereof will best be understood with reference to the following specification taken in connection with the accompanying drawings.

BRIEF DESCRIPTION OF THE DRAWINGS

FIG. 3 is a rear elevational view of the assembled structural assembly of FIG. 1;

FIG. 4 is a view in vertical section along the line 4—4 of FIG. 3;

FIG. 5 is an enlarged view showing the shifting movement of the lock pin with respect to the elongated body of the snap lock forming a part of the present invention;

FIG. 6 is a greatly enlarged view of one of the clover-leaf holes in the upright structural member illustrated in FIG. 1; and FIG. 7 is a view similar to FIG. 6 and showing the shank of a mounting stud in position in the clover-leaf hole.

DESCRIPTION OF THE PREFERRED EMBODIMENTS

Figure 1:
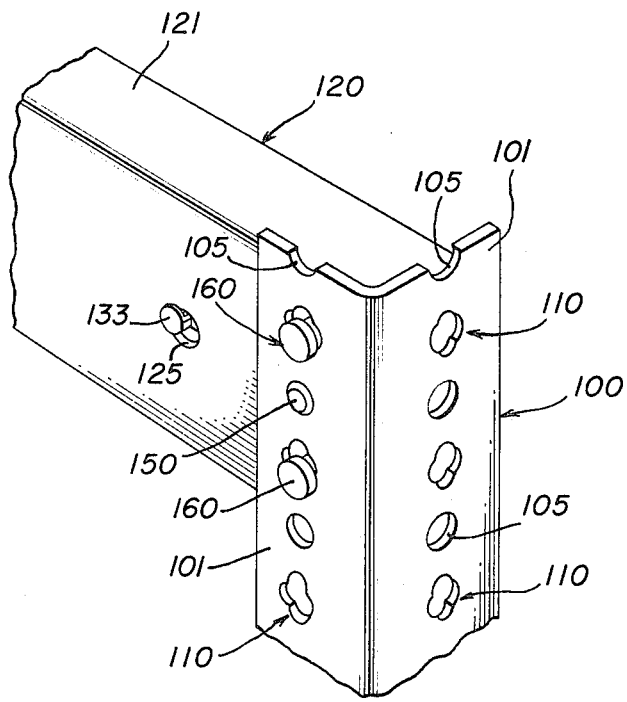
FIG. 1 is a perspective view of an upstanding structural member incorporating the present invention therein shown connected to a horizontal structural member, whereby to form a structural assembly made in accordance with and embodying the principles of the present invention.
Figure 2:
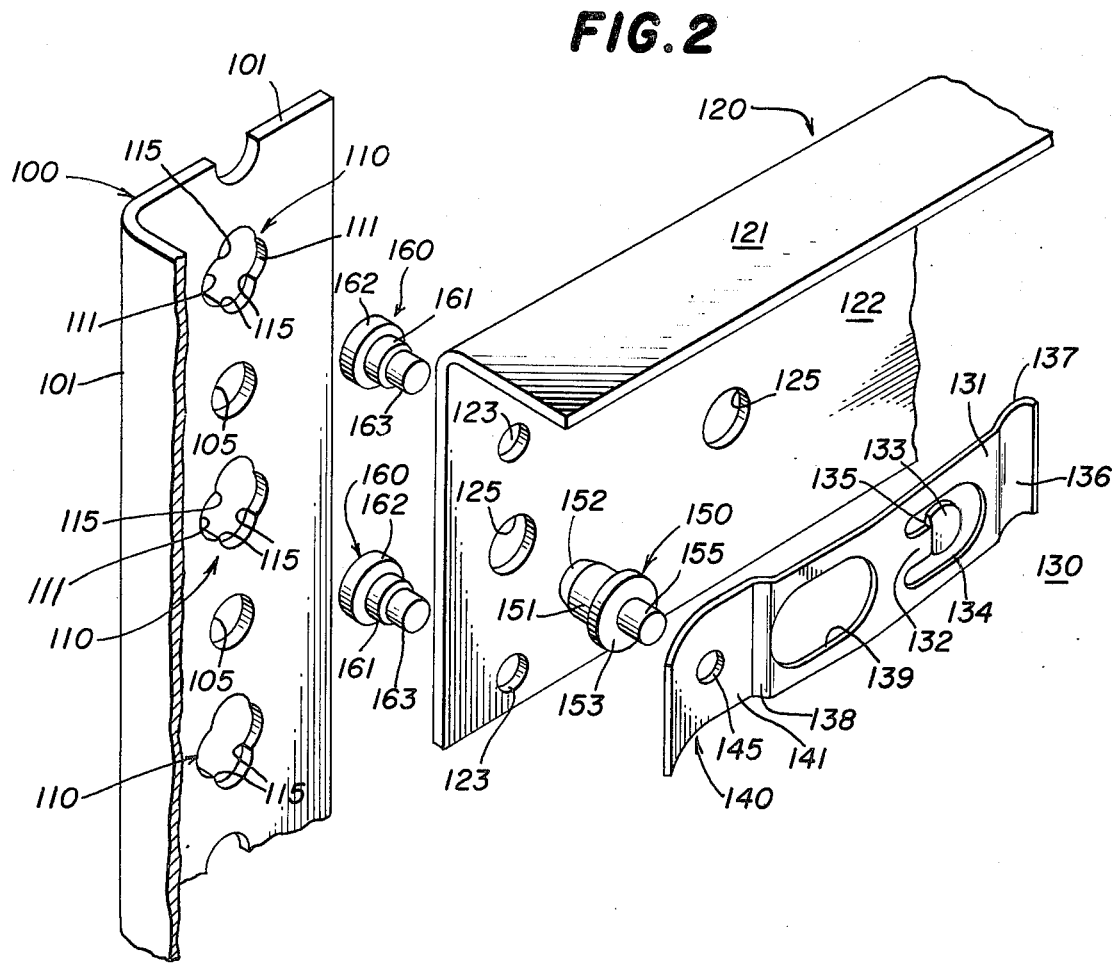
FIG. 2 is an exploded perspective view of the structural assembly illustrated in FIG. 1 and viewed from the rear thereof.

Referring to FIGS. 1 and 3 of the drawings, there is illustrated a structural assembly including an upright or structural member 100 joined to a beam 120 by a pair of mounting studs 160 engaging in the improved clover-leaf holes 110 in the upright 100, and positively held in position by a lock pin 150 forming a part of a snap lock 130 mounted on the beam 120. More particularly, the upright 100 includes two plates or flanges 101 disposed normal to each other and intended in use to be arranged with the longitudinal axes thereof disposed vertically. Each of the flanges 101 has a series of circular apertures 105 disposed in alignment with each other along the length of the flange 101, the apertures 105 being arranged with the centers thereof along a line and equidistantly spaced from each other.

Disposed between the apertures 105 and also in alignment therewith and with each other is a series of clover-leaf shaped holes 110, the construction and arrangement of one of the clover-leaf holes 110 being illustrated in detail in FIG. 6. With the upright 100 arranged vertically, the hole 110 includes four cusps 115 arranged therearound with the adjacent sides of one pair of cusps 115 being connected by a concave surface 111 and the adjacent sides of the other pair of cusps 115 being connected by a concave surface 111. The upper cusps 115 have the generally vertically arranged edges thereof formed straight as at 116, and the lower cusps 115 likewise have the generally vertically arranged edges 116 formed straight. The outer ends of the straight edges 116 respectively join concave surfaces 118 which are in turn joined by a flat surface 117. The straight edges 116 are arranged generally vertically but converge toward each other, each straight edge 116 making an angle of 2½° with the longitudinal vertical axis of the upright 100, i.e., the straight edges 116 when extended intersect with an enclosed angle therebetween of 5°. The cooperation of the lower pair of cusps 115 and the straight edges 116 thereof with the shank of an associated mounting stud 160 will be described more fully hereinafter.

Referring specifically to FIGS. 1 to 4 of the drawings, it will be seen that the beam 120 includes a relatively narrow top flange 121 integral with a relatively wider flange 122. The beam 120 is adapted to be arranged horizontally in use with the top flange 121 disposed horizontally and the side flange 122 disposed vertically. Formed in the side flange 122 are vertically aligned mounting apertures 123 for connecting the mounting studs 160 to the beam 120 (as will be described more fully hereinafter), and disposed between the mounting apertures 123 are two larger locking apertures 125 horizontally aligned.

Removably mounted on the inner side of the side flange 122 is the snap lock which is generally designated by the numeral 130, the snap lock 130 being adapted to engage in aligned apertures 105 in the upright 100 and 125 in the beam 120 to lock the vertical position therebetween. As illustrated, the snap lock 130 includes a resilient body or base 131 of spring metal or plastic having an elongated opening 134 therein into which extends a mounting finger 132 having a mounting tab 133 joined thereto but offset therefrom by means of a flange 135. The end of the base 131 adjacent to the tab 133 is deformed to provide an arcuate member 136 having a bearing surface 137 adapted to engage the adjacent surface of the side flange 122. Formed centrally in the base 131 is a second opening 139 to lend resiliency thereto, and connected at the adjacent end of the base 131 is a resilient arm 140 offset from the base 131 by a flange 138. The arm 140 includes an arcuate member 141 having an opening 145 therein to receive the lock pin 150. The snap lock 130 is mounted on the associated beam 120 by insertion of the tab 133 through one of the aligned pairs of apertures 125 therein, the tab 133 being of a size to fit through the aperture 125 and resiliently to engage the beam 120 with the base 131 on one side of the flange 122 and the tab 133 on the other side of the flange 122. The resiliency of the base 131 is such that the snap lock 130 is maintained in place by the cooperation of the tab 133 and the bearing surface 137 which serve firmly to hold the base 131 on the associated beam 120. The arm 140 is resilient and may be deformed as will be described hereinafter.

The snap lock 130 further includes the lock pin 150 having a load bearing end 151 terminating in a beveled end portion 152. An enlarged flange 153 serves to interconnect the load bearing end 151 with an outwardly extending mounting end 155 shaped and constructed to extend through the opening 145 in the resilient arm 140 and loosely to fit therewithin. Once the mounting end 155 has been positioned within the opening 145, it may be peened to provide an enlargement 156, thereby to trap the lock pin 150 in the arm 140. As illustrated, the diameter of the opening 145 is larger than the outer circumference of the end 155 to permit free movement of the end 155 within the opening 145. The lock pin 150 is preferably made of metal, but also may be made of a suitable plastic or the like.

Two mounting studs 160 are provided, each having a cylindrical body or shank 161 carrying at one end thereof an enlarged head 162 and at the other end thereof an outwardly extending portion 163. The enlarged head 162 is constructed and arranged freely to pass through one of the clover-leaf shaped holes 110 in the upright 100 while the portion 163 is constructed to fit snugly through an associated one of the mounting apertures 123 in the associated beam 120. The end of the portion 163 may be peened to provide an enlargement 165 (see FIG. 3) when the associated beam 120 and the studs 160 have been assembled, thereby fixedly to mount the studs 160 on the associated beam 120.

The upright 100 and the beam 120 may be interconnected by positioning the mounting studs 160 in registry with two of the clover-leaf shaped holes 110 in the upright 100, the shanks 161 of the mounting studs 160 being seated on the lowermost ones of the cups 115, see FIGS. 1 and 7. With the mounting studs 160 in their operative positions as illustrated in FIGS. 1 and 7, the heads 162 thereof are disposed on one side of the associated flange 101 of the upright 100 and the shanks 161 are disposed in the lowermost cusps 115 as illustrated. The beam 120 may then be struck by a mallet or the like to drive it downwardly until the beam 120 is vertically positioned with respect to the upright 100 so as to align the apertures 105 and 125 therein. The arm 140 of the snap lock 130 is deformable until the beveled end 152 of the lock pin 150 comes in contact with the edge of the apertures 125 in the beam 120. The loose engagement between the arm 140 and the lock pin 150 permits shifting movement of the lock pin 150 with respect to the arm 110, and more particularly, facilitates shifting movement until the load bearing end 151 is in registry with the aligned apertures 105 and 125. Under the urging of the resilient arm 140, the lock pin 150 moves into the aligned apertures 105 and 125 to be engaged therein. The load bearing end 151 of the lock pin 150 is constructed and arranged snugly to fit in the apertures 105 and 125 thereby to limit vertical displacement between the upright 100 and the beam 120. This action of the snap lock 130 also insures that the studs 160 are properly seated in the associated clover-leaf shaped holes 110. The arm 140 is resiliently deformable a sufficient amount to allow the lock pin 150 to be removed from the aligned apertures 105 and 125, if desired, while at the same time resilient enough continually to urge the lock pin 150 toward the associated upright 100.

Referring now to FIG. 7 of the drawings, the engagement between the shank 161 of the mounting stud 160 and the lowermost cusps 115 of the clover-leaf shaped hole 110 will be more fully described. As has been explained above, the upper sides 116 of the cusps 115 are formed straight but converge with the included angle therebetween being 5°. The cusps 115 and the shank 161 have the dimensions thereof chosen so that the nominal value of the diameter of the shank 161 is greater than the space between the points of the opposed cusps 115, whereby the shank 161 will contact the side edges 116 and be held thereby. Furthermore, the flat surface 117 is positioned so that it is disposed from the points of the cusps 115 a distance greater than the radius of the shank 161. This construction assures that there will always be space between the circumference of the mounting stud shank 161 and the flat surface 117, all as illustrated in FIG. 7 of the drawings.

The downwardly converging configuration of the straight sides 116 assures that the shank 161 of the associated mounting stud 160 will contact and be held by the straight sides 116 so long as the dimensions of the hole 110 and the dimensions of the diameter of the shank 161 of the mounting stud 160 are within the manufacturing tolerances thereof, and regardless of where each part is in the tolerance range with respect to the nominal size for those parts, thus to accommodate a substantial tolerance in the sizes of the parts with respect to the nominal sizes thereof. Although the straight sides 116 have been illustrated as making an angle of 2½° with respect to the longitudinal axis of the upright 100, whereby the included angle between the straight sides 116 is 5°, it has been found that the angle that the straight sides 116 make with the longitudinal axis of the upright 100 may lie in the range from about 1° to about 6°, with corresponding included angles between the extensions of the straight sides 116 of 2° and 12°, respectively.

The construction of the holes 110 and the cusps 115 insures that the shank 161 of the associated mounting stud 160 disposed therein is supported on and between the straight sides 116 only, i.e., the shank 161 does not rest upon the flat surface 117. As has been pointed out hereinbefore, racking between two joined members using prior systems of connection has been caused by the fact that the shank of the mounting stud has rested upon and rolled along the curved surface of a mounting hole. The structure described herein and illustrated in FIG. 7 positively precludes such rolling motion of the shank 161, the shank 161 being firmly and fixedly held upon and between the straight sides 116, with no possibility of movement or play with respect thereto. As a consequence, the joint between the upright 100 and the member 120 provided by the shank 161 of the stud 160 resting upon the straight sides 116 of the cusps 115 is firm with no racking. Therefore, auxiliary structures such as braces and the like customarily used heretofore to prevent such racking between the upright and the beam are no longer required. The snap lock 130 is provided to insure that the studs 160 are properly seated in the associated clover-leaf shaped holes 110 and to insure that there will be no disconnection between the upright 100 and the beam 120 in the event that the beam 120 has applied thereto an upward lifting force such as might occur if contacted by an upwardly moving fork lift or the like.

While there has been provided what is at present considered to be the preferred embodiment of the invention, it will be understood that various changes and modifications may be made therein, and it is intended to cover in the appended claims all such changes and modifications as fall within the true spirit and scope of the invention.

What is claimed is:

1. A structural assembly comprising a first structural member and a second structural member and a snap lock, said first structural member including a first elongated plate having a plurality of clover-leaf shaped holes therein in longitudinal alignment therealong and a first aperture between said holes, each of said holes including four cusps arranged therearound, at least two adjacent ones of said cusps each having a generally longitudinally oriented straight side with opposed ones of said straight sides being joined by a concave surface at the other ends thereof, said second structural member including a second elongated plate, at least one mounting stud on said second elongated plate and having a shank extending therefrom with an enlarged head thereon, a second aperture adjacent to said mounting stud and shaped essentially identical to said first aperture, said snap lock including a resilient body mounted on said second structural member and having a lock pin extending outwardly therefrom and loosely fitting and trapped thereon, said lock pin being constructed and arranged snugly to fit in said first and second apertures, said second elongated plate being disposed against said first elongated plate with said mounting stud extending through one of said holes and with said first and second apertures in misalignment with each other and with said first aperture in misalignment with said lock pin, said straight sides of said cusps converging toward the associated concave surface and initially being spaced apart at the points of said cusps a first distance slightly less than the diameter of said shank with the points of said cusps defining an imaginary straight line spaced from the farthest point on the associated concave surface a second distance greater than the radius of said shank, said shank being driven past the points of said cusps and being wedged and firmly seated between said straight sides with all portions of said shank spaced from the associated concave surfaces and with said first and second apertures in alignment with said lock pin snugly fitting therethrough, whereby said shank and said straight sides and said lock pin and said first aperture cooperate so that said lock pin fits through said first aperture only when said shank is in said firmly seated position, said lock pin retaining said shank along said straight sides in said firmly seated position, thus providing a tight joint between said first and second structural members and eliminating racking therebetween.

2. The structural assembly set forth in claim 1, wherein said clover-leaf shaped holes are equidistantly spaced along said first structural member and said apertures are equidistantly spaced along said first structural member between said holes.

3. The structural assembly set forth in claim 1, wherein said first structural member includes two elongated plates disposed at right angles to each other and extending the length of said first structural member, each of said plates having a plurality of said clover-leaf shaped holes and apertures therein in longitudinal alignment therealong.

4. The structural assembly set forth in claim 1, wherein said resilient body of said snap lock is removably mounted upon said second structural member.

5. A structural assembly comprising a first structural member and a second structural member and a snap lock, said first structural member including a first elongated plate having a plurality of clover-leaf shaped holes therein in longitudinal alignment therealong and a first aperture between said holes, each of said holes including four cusps arranged therearound, at least two adjacent ones of said cusps each having a generally longitudinally oriented straight side with opposed ones of said straight sides being joined by a concave surface at the other ends thereof, said second structural member including a second elongated plate, two mounting studs on said second elongated plate with the centers thereof spaced apart the same distance as the centers of said holes and each stud having a shank extending therefrom with an enlarged head thereon, a second aperture between said mounting studs shaped essentially identical to said first aperture, said snap lock including a resilient body mounted on said second structural member and having a lock pin extending outwardly therefrom and loosely fitting and trapped thereon, said lock pin being constructed and arranged snugly to fit in said first and second apertures, said second elongated plate being disposed against said first elongated plate with said mounting studs extending through two of said holes and with said first and second apertures in misalignment with each other and with said first aperture in misalignment with said lock pin, said straight sides of said cusps converging toward the associated concave surface and initially being spaced apart at the points of said cusps a first distance slightly less than the diameters of said shanks with the points of said cusps defining an imaginary straight line spaced from the farthest point on the associated concave surface a second distance greater than the radii of said shanks, said shanks being driven past the points of said cusps and being wedged and firmly seated between said straight sides with all portions of said shanks spaced from the associated concave surfaces and with said first and second apertures in alignment with said lock pin snugly fitting therethrough, whereby said shanks and said straight sides and said lock pin and said first aperture cooperate so that said lock pin fits through said first aperture only when said shanks are in said firmly seated position, said lock pin retaining said shanks along said straight sides in said firmly seated position, thus providing a tight joint between said first and second structural members and eliminating racking therebetween.

6. The structural assembly set forth in claim 5, wherein said snap lock has the body thereof removably mounted on said second structural member.

7. A structural assembly comprising a first structural member and a second structural member and a snap lock, said first structural member including a first elongated plate having a plurality of clover-leaf shaped holes therein in longitudinal alignment therealong and a first aperture between said holes, each of said holes including four cusps arranged therearound, at least two adjacent ones of said cusps each having a generally longitudinally oriented straight side with opposed ones of said straight sides being joined by a concave surface at the other ends thereof, said second structural member including a second elongated plate, two mounting studs on said second elongated plate with the centers thereof spaced apart the same distance as the centers of said holes and each stud having a shank extending therefrom with an enlarged head thereon, a second aperture between said mounting studs shaped essentially identical to said first aperture, said snap lock including a resilient body mounted on said second structural member and having an opening therein, a lock pin having a mounting end extending outwardly through said opening and loosely fitting in said opening and trapped therein, a load bearing end carried by said mounting end and constructed and arranged snugly to fit in said first and second apertures, said body being resiliently deformable to permit said load bearing end to be withdrawn from the aligned apertures in said structural members, the resiliency of said body urging said load bearing end into the aligned apertures in said structural members and maintaining said load bearing end therein, the loose engagement between said body and said mounting end providing tilting movement of said load bearing end into the aligned apertures of said structural members, said second elongated plate being disposed against said first elongated plate with said mounting studs extending through two of said holes and with said first and second apertures in misalignment with each other and with said first aperture in misalignment with said load bearing end, said straight sides of said cusps converging toward the associated concave surface and initially being spaced apart at the points of said cusps a first distance slightly less than the diameters of said shanks with the points of said cusps defining an imaginary straight line spaced from the farthest point on the associated concave surface a second distance greater than the radii of said shanks, said shanks being driven past the points of said cusps and being wedged and firmly seated between said straight sides with all portions of said shanks spaced from the associated concave surfaces and with said first and second apertures in alignment with said load bearing end snugly fitting therethrough, whereby said shanks and said straight sides and said lock pin and said first aperture cooperate so that said lock pin fits through said first aperture only when said shanks are in said firmly seated position, said lock pin retaining said shanks along said straight sides in said firmly seated position, thus providing a tight joint between said first and second structural members and eliminating racking therebetween.

8. The structural assembly set forth in claim 7, wherein the adjacent surfaces of said lock pin and said body diverge outwardly to provide for ready tilting movement therebetween, thus to facilitate movement of said load bearing end into the aligned apertures in said structural members.

9. The structural assembly set forth in claim 7, wherein, the surface of said lock pin adjacent to said body diverges from said body to provide for ready tilting movement therebetween, thus to facilitate movement of said load bearing end into the aligned apertures in said structural members.

* * * * *